F. STAINES.
PLATE AND DISH COVER.
APPLICATION FILED JUNE 14, 1907.

902,340.

Patented Oct. 27, 1908.

Witnesses
William G. Holden
Percy Johnston

Inventor
Frank Staines
by Saw Water & Sons
Attorneys

F. STAINES.
PLATE AND DISH COVER.
APPLICATION FILED JUNE 14, 1907.

902,340.

Patented Oct. 27, 1908.

Witnesses
William G. Holden
Percy Johnston

Inventor
Frank Staines
by
Caw Walker & Sons
Attorneys

UNITED STATES PATENT OFFICE.

FRANK STAINES, OF MELBOURNE, VICTORIA, AUSTRALIA, ASSIGNOR TO JOHN CLARK BOWDEN, OF MELBOURNE, AUSTRALIA.

PLATE AND DISH COVER.

No. 902,340.      Specification of Letters Patent.      Patented Oct. 27, 1908.

Application filed June 14, 1907. Serial No. 379,052.

*To all whom it may concern:*

Be it known that I, FRANK STAINES, a subject of the King of Great Britain, residing at 290 Collins street, Melbourne, in the State of Victoria, Australia, have invented an Improved Plate and Dish Cover, of which the following is a specification.

With plate and dish covers at present in use there is a great tendency for same to become accidentally displaced and thus expose the substances required to be protected. Moreover, they are usually made convex on top with a knob or handle and thus prevent one plate or dish being placed above another for convenience of transport, handling and stacking when not in use. It is mainly with the object of overcoming these defects that I have devised this invention. It will be understood, of course, that covers constructed in accordance with the present invention are applicable to both plates and dishes.

The invention is illustrated by the accompanying drawings whereof,—

Figure 1 is a plan of the cover; Fig. 2 is a vertical section through a stack of covered plates; Fig. 3 is a vertical section through two covers nested together; Fig. 4 is a vertical section through the cover showing a slight modification to facilitate cleaning; Fig. 5 is a vertical section showing the cover adapted to fit both large and small plates; Fig. 6 is a vertical section showing the application of two of said covers to keep food hot for a lengthy period; Fig. 7 is a vertical section of a cover formed with a flared rim.

According to this invention the body 1 of the cover is substantially concavo convex, being flared outwardly towards the bottom and is provided around its lower edge 2 with a plurality of downwardly extending lugs or legs arranged to project over the edge of the plate. These lugs or legs are preferably formed so as to extend laterally as at 3 and then bent downwardly at their ends or formed with one or more downwardly extending hooks 4 which are adapted to fit over the edge 5 of the plate 6 and thereby avoid accidental lateral displacement. The most convenient number of legs or lugs is three. When said covers are required to fit different sized plates said lugs are provided with a corresponding number of hooks 4, 4 as shown in Fig. 5. The top 7 of the cover is made approximately flat and around its upper edge is provided an upwardly extending portion or annular rim 8 upon which the convex bottom 9 of the plate 6 is seated. By this construction the plate when placed on the rim will readily find its own level and remain steady while, furthermore, the top of the cover cannot possibly be scratched or disfigured as the only point of contact with the plate is its rim. In this manner a series of plates and covers may be stacked one above the other with safety thus facilitating their transport from one place to another. Furthermore, the annular rim 8 acts as a handle by which the cover may be lifted from the plate, and the flat top inside said rim may be used to carry cups, teapots or such like, as shown in Fig. 5.

It will be noted that the lugs project below the bottom edge of the cover so that when it is removed from a plate and placed on a table or tray said cover is clear of the table thus preventing the possibility of the cover communicating food stuffs thereto, or vice versa (see Fig. 3). This Figure also shows the manner in which the covers when not in use are nested and it will be apparent that a large number thereof may be packed in a limited space while, furthermore, the danger of said covers scratching one another is minimized as the only point of contact is that between the edge of one rim thereof and the bottom of the superposed one.

It will be obvious that the annular rim need not be continuous so long as there is sufficient support for the bottom of the plate; thus in Fig. 4 portions of the rim are cut away or said rim is formed with openings 10 which also facilitate the draining away of water from inside said rim when cleaning the covers.

Figure 1:
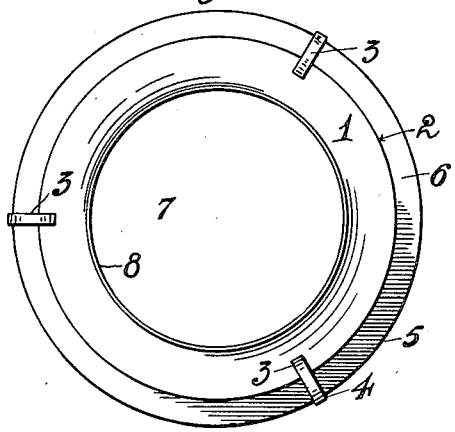
Figure 2:
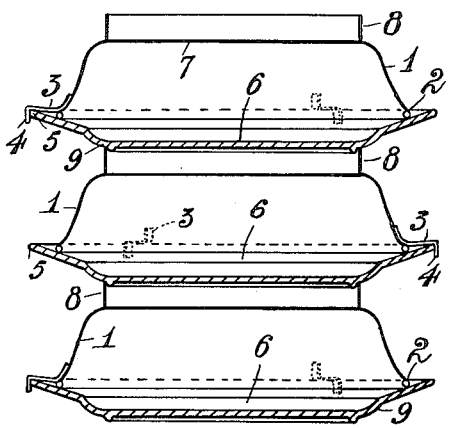
Figure 3:
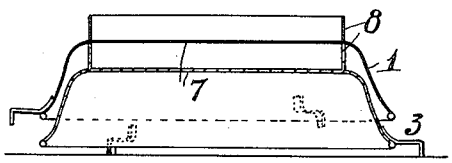
Figure 4:
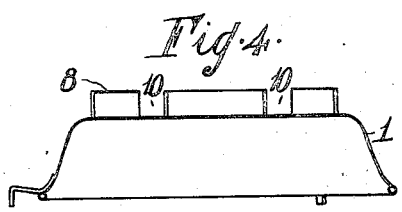
Figure 5:
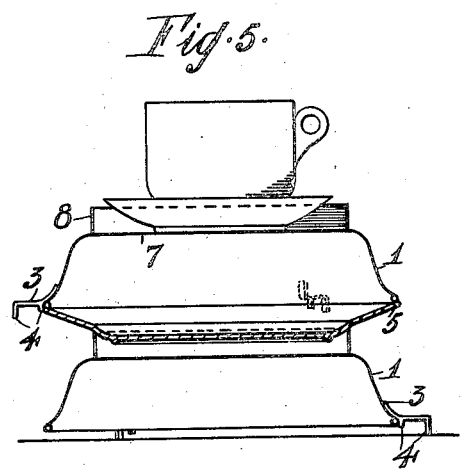
Fig. 5 shows a cover having lugs each formed with two hooks the inner of which is for use with a small plate and the outer for a large plate.
Figure 6:
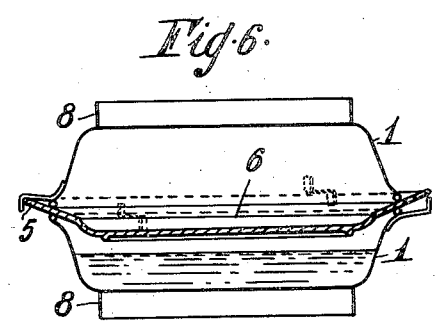
Fig. 6 shows how a plate may be placed between two covers, the lower one of which is inverted and adapted to contain hot water by which means the contents of the plate may be kept warm for a considerable period. It will be readily understood that by inverting a cover as shown in Fig. 6 that same may be used as a dish.
Figure 7:
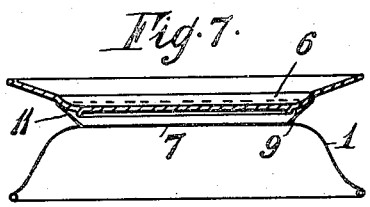
Fig. 7 shows a cover formed with a flared rim 11 which affords a good seat for the convex bottom 9 of a plate.

Having now particularly described and ascertained the nature of my said invention and in what manner the same is to be performed I declare that what I claim is,—

1. A cover for plates and dishes having a set of lugs extending downwardly below its lower edge to space the said edge of the cover above a support and adapted to project outwardly over the edge of the plate or dish to center and retain the cover thereon.

2. A cover for plates and dishes having a plurality of lugs projecting downwardly below the plate engaging edge thereof to provide spaced supports for the cover and adapted to project outwardly over the edge of the plate or dish to retain the cover thereon, and provided with an upwardly extending rim on the upper portion of the cover.

3. A cover for plates and dishes having lugs projecting laterally from the plate engaging edge thereof and adapted to coöperate with the periphery of a plate, and supplemental hooks on the lugs projecting outwardly and downwardly beyond the peripheral edge of the cover for accommodating plates or dishes of different sizes.

4. A cover for plates and dishes comprising a body of substantially concavo convex form having lugs projecting radially from its peripheral edge, the lugs being provided with downturned hooks extending below the said edge of the cover, and a rim projecting upwardly from the convex side of the body.

5. A cover for plates and dishes comprising a body flared outwardly towards the bottom edge and formed with a substantially flat top, a rim extending upwardly from the top of the body, and a set of lugs projecting below the bottom edge of the body and serving to support the latter with its bottom edge removed from the table or other support.

6. A cover for plates and dishes comprising a hollow body approximately concavo-convex, the convex side having a substantially flat top, and the lower peripheral rim or edge being adapted to engage a plate or dish, and a plate supporting rim extending upwardly from the flat top of the cover, the rim being substantially conical and having its smaller end attached directly to the flat top of the cover.

In testimony whereof I have hereunto set my hand in presence of two subscribing witnesses.

FRANK STAINES.

Witnesses:
EDWARD NEEDHAM WATERS,
WILLIAM HERBERT WATERS.